L. B. ANDERSON.
STREET INDICATOR.
APPLICATION FILED MAY 28, 1912.
1,045,494.
Patented Nov. 26, 1912.
2 SHEETS—SHEET 1.
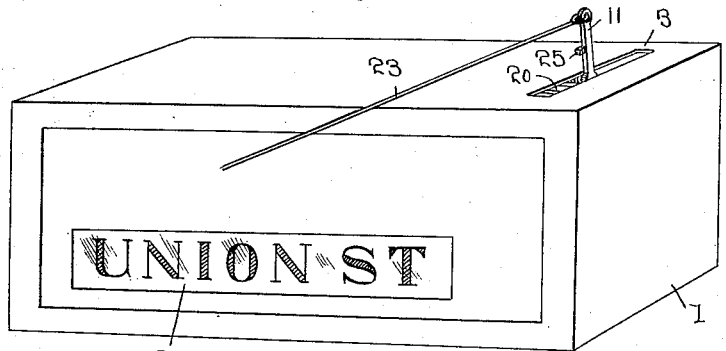
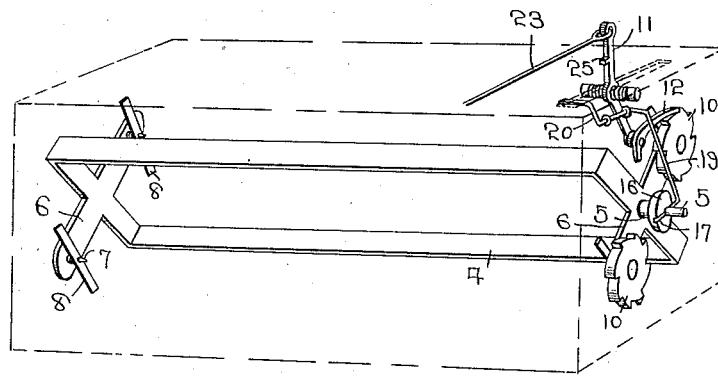
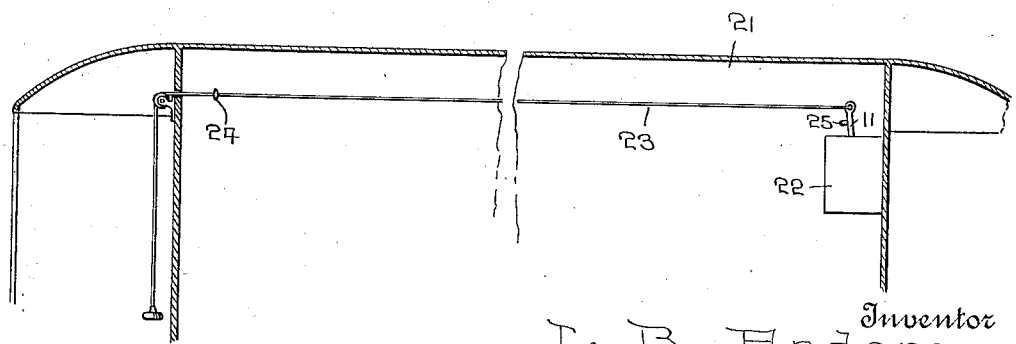
Witnesses
Thos. W. Riley
M. Newcomb
Inventor
L. B. Anderson
By W. J. FitzGerald & Co.
Attorney L. B. ANDERSON.
STREET INDICATOR.
APPLICATION FILED MAY 28, 1912.
1,045,494.
Patented Nov. 26, 1912.
2 SHEETS—SHEET 2.
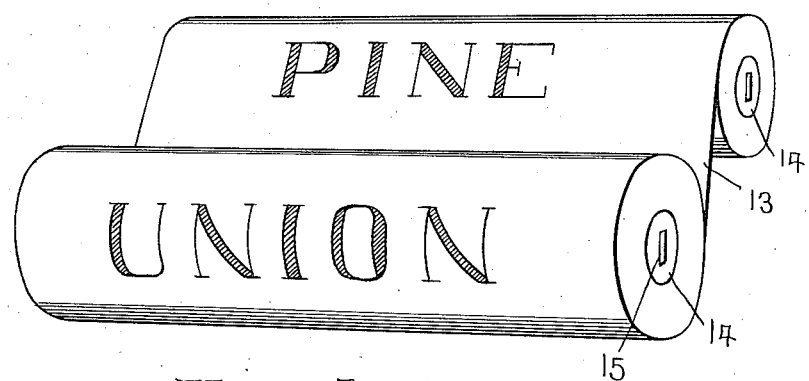
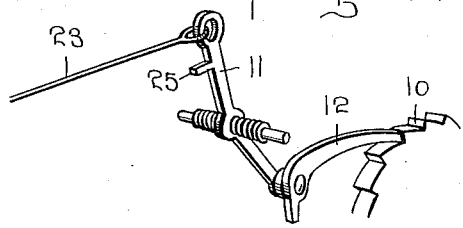
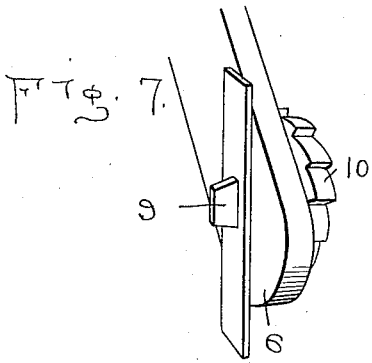
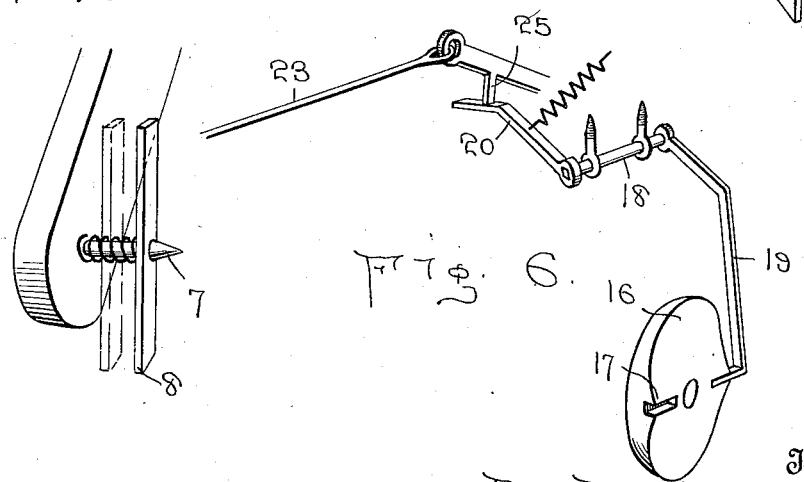
Witnesses
Thos. W. Riley
M. Newcomb
Inventor
L. B. Anderson
By W. J. FitzGerald & Co.
Attorneys

UNITED STATES PATENT OFFICE.

LUTHER B. ANDERSON, OF SEATTLE, WASHINGTON.

STREET-INDICATOR.

1,045,494. Specification of Letters Patent. Patented Nov. 26, 1912.

Application filed May 28, 1912. Serial No. 700,292.

*To all whom it may concern:*

Be it known that I, LUTHER B. ANDERSON, a citizen of the United States, residing at Seattle, in the county of King and State of Washington, have invented certain new and useful Improvements in Street-Indicators; and I do hereby declare the following to be a full, clear, and exact description of the invention, such as will enable others skilled in the art to which it appertains to make and use the same.

My invention relates to new and useful improvements in street indicators.

An object of my invention is to provide a device of this character which obviates the necessity of rewinding the roll of indicator cloth after a trip has been made. This I accomplish by providing a mechanism for automatically shifting the positions of the indicator cloth receiving rollers.

Other objects and advantages will be hereinafter made clearly apparent in the following specification.

In the drawings, Figure 1 represents a perspective view of the indicator casing constructed in accordance with my invention. Fig. 2 is a perspective view of the operating mechanism for the indicator. Fig. 3 is a sectional view through a street car showing my invention applied thereto. Fig. 4 is a detail perspective view showing the manner of marking the indicator cloth. Fig. 5 is a detail perspective view of the operating means for the indicator spools and cloth. Fig. 6 is a detail perspective view of the trip mechanism. Fig. 7 is a detail perspective view of one of the spool receiving and operating ends of the rotatable frame, and, Fig. 8 is a detail perspective view of the spool receiving end at the opposite end of the rotatable frame.

Referring to the drawings, 1 represents a suitable casing having a portion of the front thereof cut-away and provided with a transparent material 2, and a slot 3 formed in the top thereof. Rotatably mounted within the casing is a frame 4, having journals 5 mounted for rotation in the sides of the casing. The ends of the frame are provided with lateral extensions 6, and within the extensions 6 of one end of the frame are mounted spring pressed pointed spikes 7 supporting cross arms 8, while the extensions at the opposite end of the frame are provided with wedge shaped lugs 9, journaled in the extensions 6 and having ratchet wheels 10 fixed on the extended journals. Mounted within the slot 3 in the casing is the spring actuated lever 11 having an eye in one end thereof and the opposite end provided with a pivotally mounted pawl 12. The pawl is adapted for engagement alternately, with each of the ratchet wheels 10, and is adapted to be actuated by means of the swinging lever 11. The indicator cloth 13 is reeled upon a pair of suitable spools 14, each having one end provided with an angular opening 15, within which is adapted to engage the wedge shaped lug 9 to operate the indicator cloth. The markings upon the indicator cloth are upon both of its surfaces, but in reverse order. In order to retain said frame 4 in proper position, I provide upon the end 5 of the frame a dished wheel or rotary keeper 16, having recesses 17 formed at diametrically opposite points in the sides thereof. Pivotally mounted within the casing 1, above the dished wheel 16 is a shaft 18 provided at one end with a locking arm 19, having an end which is turned at right angles and adapted for engagement within the recess 17 of the keeper 16. Positioned at the opposite end of the shaft 18 is a trip arm 20 which is disposed in the path of the lever 11 when it is moved considerably beyond the point required for actuating the ratchet wheels 10, and is adapted to press the trip arm 20, so as to actuate the locking arm 19, whereby the frame 4 will be unlocked and free to rotate.

In practice, I provide the forward end of a street car 21 with my indicator 22, and connect therewith a suitable operating cord 23 which extends through the car to the rear platform thereof. A suitable stop 24 is positioned adjacent the operating cord 23 and is adapted to limit the movement thereof when said cord is pulled at the free end.

In operation, let it be assumed that the indicator cloth bearing the desired names of the streets is rolled upon the lower spool 14, and as each street is passed, the operator changes the indicator by actuating the free end of the cord 23. When the roll of indicator cloth has been entirely unwound from the lower roller and fed upon the upper roller, the operator grasps the cord 23 in front of the stop 24 and depresses the lever 11 to such an extent that the projection 25 bears upon the trip arm 20 and releases the locking arm 19. The frame 4 is then free to rotate, and the weight of the upper full spool 14 will descend by gravity and cause the frame to complete one-half of a revolution, when the locking arm 19 will again engage within the opposite recess 17 and lock the frame in such position that the full spool is in the position formerly occupied by the empty spool.

What I claim is:—

1. In a device of the character described, a casing, a frame rotatably mounted in the casing, a pair of spools rotatably mounted in the frame and having an indicator cloth wound thereon, means including a keeper and a latch for retaining the frame in either of two alternative positions and thereby retaining the spools in an upper and a lower position respectively, spool-actuating means whereby the cloth may be unwound from the lower spool onto the upper spool, and means coacting with the spool-actuating means for disengaging the latch from the keeper and thereby allowing the excessive weight of the cloth on the upper spool to cause the frame to rotate and to reverse the positions of the spools relative to the casing.

2. In a device of the character described, a rotatably mounted frame, a pair of rotatably mounted spools carried by the frame, retaining means for holding the respective spools alternatively in an upper and a lower position, an indicator cloth carried by the spools and adapted to be wound from the lower spool onto the upper spool, and means for releasing the retaining means and thereby allowing the frame to be rotated by the excessive weight of cloth on the upper spool through one-half of a revolution.

In testimony whereof I have signed my name to this specification in the presence of two subscribing witnesses.

LUTHER B. ANDERSON.

Witnesses:
T. R. SHAVE,
W. H. BAIN.

Copies of this patent may be obtained for five cents each, by addressing the "Commissioner of Patents, Washington, D. C."